July 3, 1956  C. VON DOENHOFF  2,752,739
ABRASIVE CUT-OFF WHEELS AND METHOD OF MANUFACTURING THE SAME
Filed Sept. 10, 1953  2 Sheets-Sheet 1

INVENTOR.
CARL VON DOENHOFF
BY

July 3, 1956  C. VON DOENHOFF  2,752,739
ABRASIVE CUT-OFF WHEELS AND METHOD OF MANUFACTURING THE SAME
Filed Sept. 10, 1953  2 Sheets-Sheet 2

INVENTOR.
CARL VON DOENHOFF
BY

2,752,739

ABRASIVE CUT-OFF WHEELS AND METHOD OF MANUFACTURING THE SAME

Carl von Doenhoff, Niagara Falls, N. Y., assignor to The Carborundum Company, Niagara Falls, N. Y., a corporation of Delaware Application September 10, 1953, Serial No. 379,447

10 Claims. (Cl. 51—206)

This invention relates to organic bonded abrasive cut-off wheels and a method of manufacturing the same from mixes which are sufficiently plastic to flow under pressure.

Abrasive cut-off wheels are large-diameter, comparatively thin wheels which are used for cutting off various materials. They are commonly made with a bond of either synthetic resin or rubber. Where the former is employed it is most common to make a dry-moldable mix which is shaped into a wheel by pressing in a mold although such wheels may also be made by preparing a plastic mix and rolling sheets from such mix as described and claimed in U. S. Patent No. 1,963,253.

It is quite common to form rubber bonded cut-off wheels by preparing a mix in the form of a sheet made by compounding the ingredients with the rubber and admixing the abrasive grains on rolls, rolling the compounded sheet to the desired thickness and finally dieing out the wheel of the desired diameter from such sheet. One difficulty with such a process has been that very wide rolls are required in order to get wheels of large diameter.

One object of the present invention is to provide a method for making large diameter cut-off wheels from sheets which are narrower than the diameter of the wheel. Another object of the invention is to provide large diameter cut-off wheels made from two or more slabs of sheeted plastic abrasive mix. Another and more specific object of the invention is to provide a rubber bonded cut-off wheel of large diameter comprising at least two slabs of bonded abrasive material overlapped and united by an intermingling of adjacent surfaces of the slabs resulting from plastic flow of the mass of grain and bond which forms the slabs. Other objects of the invention will be apparent from a consideration of the description which follows.

We have discovered that it is possible to unite two or more slabs of abrasive mix in the raw or uncured state in which the bond and grain mixture has sufficient plasticity to flow under pressure by overlapping slabs of the mixture and pressing them at the overlap to cause the overlapped portions to flow together and join into a unitary article. I have illustrated the invention by drawings in which.

Figure 1:
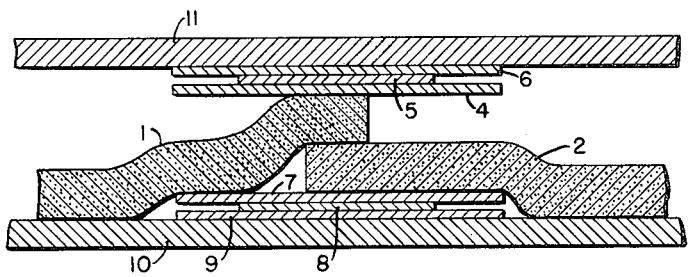
Fig. 1 is a cross-section, greatly enlarged, illustrating one method and form of apparatus for carrying out the invention.

Referring to the drawings, two slabs of suitable abrasive mix 1 and 2 are assembled by first placing a composite compression member formed of strips 7, 8 and 9 of spring steel which may be about .010 inch thick upon a compression plate 10. The slab 2 of abrasive mix is then placed upon element 7 of the compression member is such a manner as to overlap a portion thereof and slab 1 is then laid on slab 2 with a suitable amount of overlap which may, for example, be ⅜ to ½ inch. A similar assembly of compression elements 4, 5 and 6 is then placed on the top of that portion of slab 1 which overlaps slab 2 and is aligned therewith in both directions. A second compression plate 11 is then placed on element 6 and the assemblage is ready for pressing. It is to be understood that compression plates 10 and 11 are at least as long as the diameter of the wheel which is to be formed.

Figure 2:
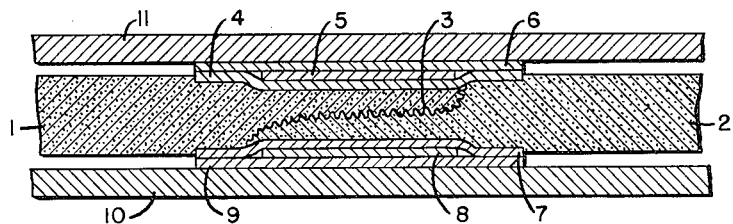
Fig. 2 is a cross-section showing the material of Fig. 1 after pressure has been applied.

The assemblage shown in Fig. 1 is then placed under suitable pressure as by being put on the platen of a hydraulic press and applying pressure whereupon the assemblage assumes the form shown in Fig. 2 in which the joint 3 between slabs 1 and 2 is formed by an intermingling of the abrasive grains and bond of the two slabs so that a strong joint is formed.

The plastic mixes which are commonly used in making abrasive products usually have some "spring-back" so that when the pressure is removed from the assemblage there may be an increase in thickness at the portions to which the pressure is applied. The final thickness of the joint is determined by the plasticity and degree of spring-back of the mix as well as by the amount of pressure which has been applied.

Figure 4:
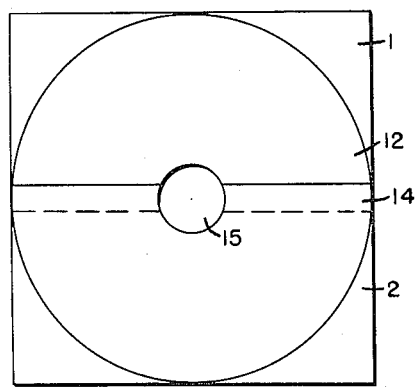
Fig. 4 is a plan view of an article formed by the invention at an intermediate stage.

Fig. 4 illustrates the formation of a wheel according to the process just described wherein two slabs of substantially the same length and width are overlapped and a wheel is died out in such manner as to leave a joint at a diameter of the wheel. In Fig. 4 the wheel 12 is formed with a joint 14 and is provided with a suitable arbor hole 15. This drawing illustrates a wheel in the intermediate stage where a die has been applied to cut out the wheel 12 with its arbor hole 15 and the unused portion of slabs 1 and 2 are shown in place.

Figure 5:
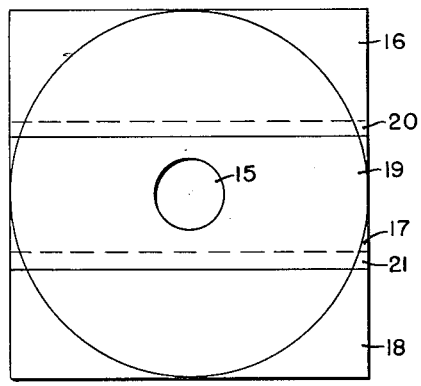
Fig. 5 is similar to Fig. 4 but illustrates the article in this form when made from three slabs.

Fig. 5 is a plan view of a wheel formed according to the invention from three slabs of approximately the same length and width. In this figure the joints 20 and 21 are formed at the juncture of slabs 16 and 17, and 17 and 18 respectively. The wheel 19 with arbor hole 15 has been died from the slabs.

Figure 6:
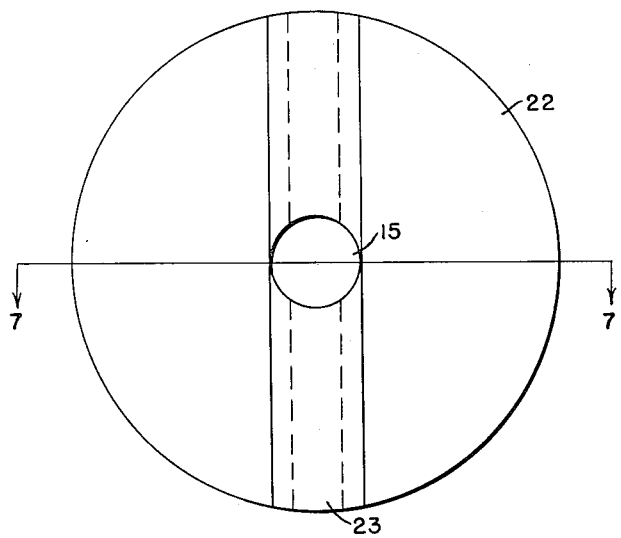
Fig. 6 is a plan view of a finished wheel made in accordance with the invention.
Figure 7:
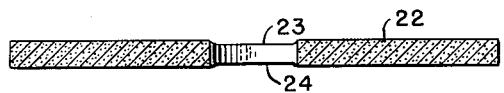
Fig. 7 is a cross-section on the lines 7—7 of Fig. 6.

Fig. 6 is a plan view of a completed wheel 22 having a joined section 23 on the lower surface as shown in Fig. 7, which is a cross-section of the finished wheel shown in plan in Fig. 6.

While the exact composition of the mixture reported forms no part of the present invention since it is applicable to numerous types of plastic mixes which can be sheeted and combined under pressure, I will illustrate the invention by reference to an example. It is to be understood that the example is for illustrative purposes only and is not limitative.

A mixture for making a rubber bonded cut-off wheel in accordance with the invention was the prepared by first breaking down 23 parts of smoked sheet rubber and 47 parts of a copolymer of butadiene and acrylic nitrile available commercially as "Hycar OR 15" to form a plastic rubber mass. The following materials in the amounts shown were then compounded into the rubber mass in accordance with customary practice:

|  | Parts |
|---|---|
| Liquid phenolic resin | 20 |
| Aluminum flake | 100 |
| Sulfur | 35 |
| 46 grit fused alumina | 775 |

The liquid resin was a heat-hardenable phenolformaldehyde condensation product in the "A" stage advanced to the point where it had a viscosity of 20,000 centistokes. Aluminum flake is a very finely divided clay which is commonly used in compounding rubber.

After the ingredients had been throughly commingled the mass was sheeted into a slab 14 inches wide and 28 inches long which was then cut to form two slabs 12 inches square and approximately .170 inch thick. One of these slabs was then laid on the second slab with an overlap ½ inch, the two slabs being put on a galvanized steel sheet approximately 1/16 inch thick.

A compression member was made by sandwiching a strip of spring steel .010 inch thick and 1 inch wide between two similar strips which were 2 inches wide, all of the strips being 32 inches long and the inner strip being centered between the two outside strips. This compression member was then placed on a galvanized steel supporting plate 30 inches square by 1/16 inch thick and one of the slabs of mix was laid along the compression member in such a way that the edge of the slab was approximately ¾ inch from the uncovered edge of the compression member. The second slab was then laid on the supporting plate and the first slab in such a way as to provide an overlap of ½ inch between the two slabs whereupon a second compression member similar to the one described and a compression plate similar to the supporting plate member was laid on the second slab in such a way that the two compression members were in substantial alignment both lengthwise and crosswise.

The assemblage was then placed on a platen of a hydraulic press having a ram 16 inches in diameter, and the platen was raised and the elements were compressed to a gauge pressure of 1000 pounds per square inch. When the pressure was applied the assemblage was squeezed together as shown in Fig. 2, substantially all the pressure being applied between the compression members. During this stage in the process the mix flowed at the overlap and formed a joint which, upon removal from the press, was approximately .155 inch thick.

A wheel 26 inches in diameter having an arbor hole of 1 inch in diameter was then cut from the combined slab and was cured in an oven for 16 hours at a temperature of approximately 300° F.

The thickness of the joint is determined by the plasticity of the mix. It is desired that the conditions be adjusted such that the thickness at the joint is not greater than that in the remaining portions of the wheel and for this reason it is usually advisable to select conditions such that the thickness at the joint is slightly less than the thickness of the remainder of the wheel since such a condition is not harmful.

Figure 3:
Fig. 3 is a form of compression member which may be used in carrying out the invention.

Instead of using an assemblage of spring steel strips to make the compression member such a member may be shaped from a piece of suitable steel as illustrated in Fig. 3.

Figure 8:
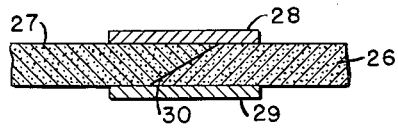
Figs. 8 and 9 are sections, somewhat enlarged, illustrating alternative methods of forming articles in accordance with the invention.
Figure 9:
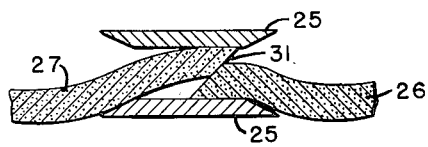

In another embodiment of the invention illustrated in Figs. 8 and 9 the slabs 26 and 27 may be provided with complementary tapers which are completely overlapped and placed between compression members 28 and 29, as shown in Fig. 8 to form a joint 30, or partially overlapped between a pair of compression members 25, as shown in Fig. 9. When pressure is applied to the assemblage illustrated in Fig. 8 the resulting joint will be somewhat less in thickness than the remaining portion of the slabs.

When pressure is applied to the assemblage of Fig. 9 the amount of overlap may be made such that the thickness is substantially the same or slightly less than the remaining portions of the slabs. In either case the pressure is concentrated at the overlapping portions so as to form a strong joint without materially changing the thickness of the remaining portions of the slabs.

When the assemblage is compressed there is considerable plastic flow not only between the two slabs but at that portion of the mass which is in contact with the compression members. For that reason I have found it desirable at times to interpose between the compression member and the slab mix a sheet of suitable plastic material such as polyethylene or even a sheet of paper so that the scratches which would otherwise be imparted to the steel compression members are made in the interposed sheets and the compression members are thereby protected. One satisfactory material which I have used is a sheet of polyethylene .004 inch thick and of substantially the same dimensions otherwise as that element of the compression member to which it is applied.

While the example illustrates the formation of a wheel from a sheet in which the bond is primarily rubber, the process of the invention is equally well applicable to other kinds of bonds provided only that they are sufficiently plastic to be capable of being rolled into sheets and of flowing under pressure to form a strong joint. Examples of such mixes are to be found in the Upper Patent No. 1,963,253 mentioned above and the patent to Coes No. 2,401,138. Upper forms his wheel from a mixture of liquid and powdered phenolic resin and grain so proportioned as to make a mix which can be rolled into sheets while Coes uses a powdered phenolic resin plasticized with tri-glycol dichloride.

Other suitable plastic mixes can be used and other rubber compositions such as those made from crude rubber alone or from synthetic rubbers alone such as the copolymers of butadiene and styrene (e. g. "GRS" rubber) suitably compounded and provided with a vulcanizing agent may be employed and other modifications common in the abrasive art such as the employment of various kinds of fillers and other kinds and sizes of abrasive grains may be used without departing from the spirit of the invention the scope of which is defined in the appended claims.

I claim:

1. In the manufacture of abrasive cut-off wheels, the steps which comprise: preparing from a mass of abrasive grains and a heat-hardenable bond at least two slabs which are of substantially the same thickness and are sufficiently plastic to flow under pressure; placing a part of one such slab at and near an edge on a compression member; placing part of a second such slab on at least a part of that part of the first slab which is on the compression member; placing a second compression member on the second slab so that it is substantially aligned with the first compression member; applying pressure to the assemblage at the compression members to cause those parts of the slabs which are in contact to flow and form a strong joint of approximately the same thickness as the other parts of the slabs; dieing the slabs so that the assembled and compressed article is in the form of a wheel; and heating the wheel to heat-harden the bond.

2. Method as claimed in claim 1 in which the steps of dieing the wheel from the slabs is performed after the slabs have been assembled and joined by pressure.

3. Method as claimed in claim 1 comprising the additional step of applying a coating of an adhesive to at least one of the slabs at that part of the slab which overlaps a second slab prior to the step of overlapping the slabs.

4. An abrasive cut-off wheel comprising at least two slabs of bonded abrasive partially overlapped at and near an edge of each of the slabs and united by an intermingling of adjacent surfaces of the slabs at the overlapped portions resulting from plastic flow of the mass of grain and bond forming the slabs, both sides of the wheel being continuous over their entire areas as substantially plane surfaces except for the arbor hole at the center, and the wheel being of substantially uniform thickness throughout.

5. A wheel as claimed in claim 4 wherein the bond comprises essentially an elastomer selected from the group consisting of natural rubber, a copolymer of butadiene with acrylic nitrile, a copolymer of butadiene with styrene, and a mixture of two or more of the previously-named members of the group.

6. A wheel as claimed in claim 5 wherein the elastomer comprises essentially natural rubber and a copolymer of butadiene with acrylic nitrile.

7. A wheel as claimed in claim 6 wherein the proportions of natural rubber and the copolymer are in the approximate proportions of 1:2, respectively.

8. An abrasive cut-off wheel consisting of two slabs of bonded abrasive partially overlapped at and near an edge of each of the slabs and united by an intermingling of adjacent surfaces of the slabs at the overlapped portions resulting from plastic flow of the mass of grain and bond forming the slabs, both sides of the wheel being continuous over their entire areas as substantially plane surfaces except for the arbor hole at the center, and the wheels being of substantially uniform thickness throughout.

9. A wheel as claimed in claim 4 wherein the slabs are provided with complementary tapers at the parts of the slabs which are overlapped.

10. A wheel as claimed in claim 4 which additionally includes a layer of adhesive between the overlapped portions of the slabs.

References Cited in the file of this patent

UNITED STATES PATENTS

| | | |
|---|---|---|
| 2,033,263 | Tone | Mar. 10, 1936 |
| 2,384,684 | Kistler | Sept. 11, 1945 |
| 2,422,153 | Ninwegen | June 10, 1947 |
| 2,457,516 | Allison | Dec. 28, 1948 |
| 2,577,060 | Wooddell | Dec. 4, 1951 |